Aug. 28, 1928. Re. 17,073

E. J. SERPAS

AUTOMATIC LUBRICATING MECHANISM

Original Filed March 19, 1926 2 Sheets-Sheet 1

Inventor

E. J. Serpas

By Wilkinson & Giusta

Attorneys.

Aug. 28, 1928. Re. 17,073
E. J. SERPAS
AUTOMATIC LUBRICATING MECHANISM
Original Filed March 19, 1926 2 Sheets-Sheet 2
Fig. 3.
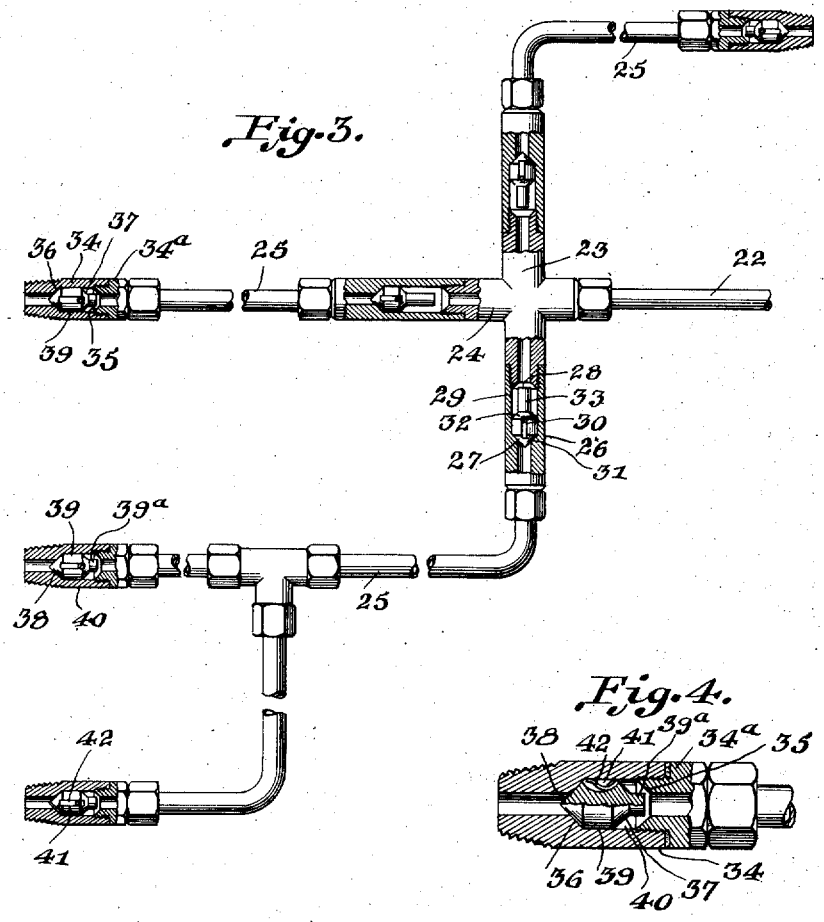
Fig. 4.
Fig. 5.
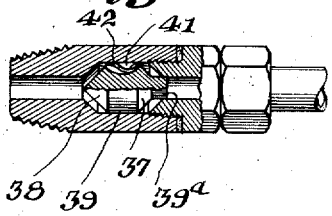
Fig. 6.
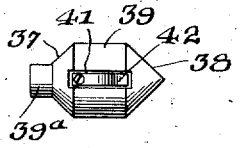
Inventor
E. J. Serpas
By Wilkinson & Gusta
Attorneys.

Reissued Aug. 28, 1928. Re. 17,073

UNITED STATES PATENT OFFICE.

ERNEST J. SERPAS, OF NEW ORLEANS, LOUISIANA, ASSIGNOR OF TWO-FIFTHS TO J. S. WATERMAN, JR., OF NEW ORLEANS, LOUISIANA.

AUTOMATIC LUBRICATING MECHANISM.

Original No. 1,669,351, dated May 8, 1928, Serial No. 95,959, filed March 19, 1926. Application for reissue filed June 25, 1928. Serial No. 288,213.

This invention relates to lubricating apparatus, and has for its object the provision of a main artery automatic lubricating device which, owing to the construction thereof, causes a certain amount of lubricant to be supplied to the various wearing parts of an automobile or other mechanism.

An important object is the provision of a lubricating device which, if installed upon a motor vehicle or the like machine subject to jars, may be operated by the shocks or jars incidental to travel of the vehicle over roads.

Another object is the provision of a device of this character which, regardless of where it is used or with what machine, is so constructed and arranged as to embody a positively actuated pump which acts to control the metering or feed valve for supplying the lubricant to the wearing parts.

An additional object is to provide a mechanism of this character which will be comparatively simple and inexpensive in manufacture, and installation, positive in action, efficient and durable in service, and a general improvement in the art.

With the above and other objects and advantages, the invention consists in the details of construction, and the arrangement and combination of parts to be hereinafter more fully described and claimed, and illustrated in the accompanying drawings, in which:—

Figure 3 is an elevation, partly in section, showing the distributing pipe and metering valves.

Figure 4 is a detail sectional view through one of the metering valves and its mounting.

Figure 5 is a longitudinal section taken on an enlarged scale through one of the metering valves and the spring by-pass, and Figure 6 is a top plan view of one of the metering valves and by-pass.

Figure 1:
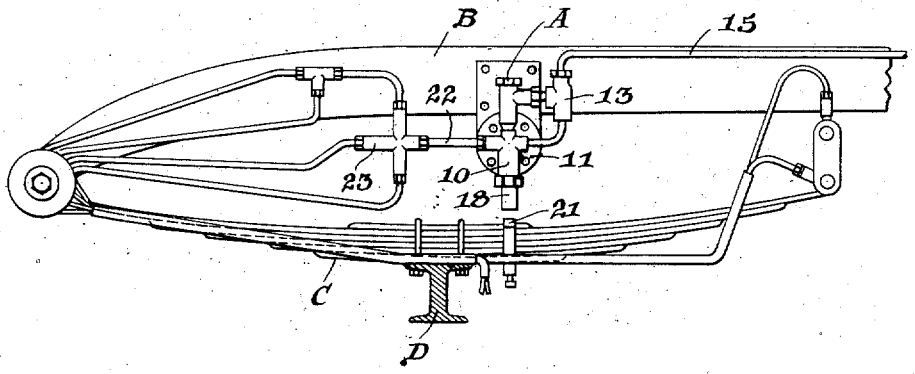
Figure 1 is a fragmentary side elevation of the front portion of the frame of a motor-vehicle showing the mechanism in applied position, the vehicle axle being shown in section.
Figure 2:
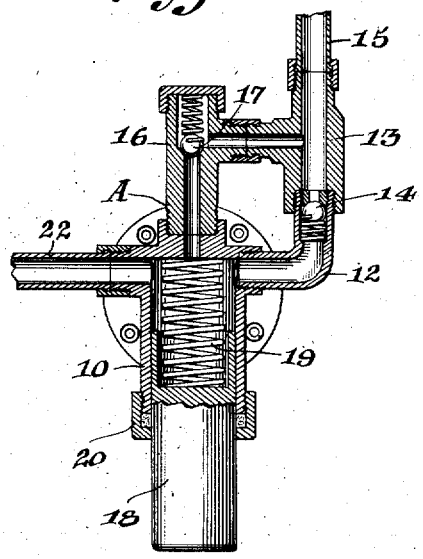
Figure 2 is a sectional view, on a larger scale, through the pump mechanism.

Referring more particularly to the drawings, I have shown the device as including a pump mechanism indicated generally by the letter A mounted as for instance upon one of the frame bars B of an automobile or the like at a point above the spring C and axle D. Of course there is no limitation as to the exact place where the device is mounted or the manner of securing it in place, the intention being that it be located on some part of a vehicle near which is another part movable with respect thereto as for instance when shocks or jars occur as during road travel.

The pump device A is shown as comprising a casing 10 carrying an attaching plate 11 by means of which it may be bolted or otherwise suitably secured to the frame bar B. Connected with one side of the casing is an elbow 12 which in turn connects with a T-shaped member 13 through a check valve 14. Connected with the upper end of the T-shaped member 13 is a supply pipe 15 leading from any suitable source, such as a tank located at a convenient place upon the vehicle. Mounted on the top of the casing member 10 is an additional T-shaped member 16 which connects with the member 13 through a downwardly spring pressed check valve 17.

Slidably mounted within the lower end of the casing 10 is a plunger 18 urged downwardly by a coil spring 19 located within the casing 10. A suitable packing gland 20 is preferably provided at the lower end of the casing 10 where the plunger 18 passes thereinto for the purpose of preventing leakage of oil. The plunger 18 is designed to be actuated by means of an abutment element 21 of any ordinary or preferred type mounted upon the spring C, axle D or other equivalent location in such position as to engage the plunger 18 and move it upwardly in case the vehicle strikes an obstruction or is otherwise given a shock or jar.

Connected and communicating with the casing and at the upper portion thereof is an outlet pipe 22 which connects with a distributor mechanism indicated generally at 23, the distributor mechanism including a T 24 with which connects any desired number of pipes 25 leading to various points to be lubricated. Interposed between the casing member 24 and the various pipes 25 are valve devices including casing 26 having suitable threaded or other connections with the member 24 and suitable union connections or the like with the various pipes 25. Each of these valve members 26 is formed with a seat 27 and the ends of the branches of the T member 24 are likewise formed with seats 28. The space within the casings 26 of the valve devices constitute displacement chambers 29, and located within these spaces or chambers are valves 30 which are mounted for reciprocatory or sliding movement and which are double ended inasmuch as they have valve portions 31 coacting with the seats 27 and other valve portions 32 coacting with the seats 28, the valves having stems 33 for a purpose to be described.

At the free ends of the pipes 25 are other valve devices including casings 34 in one end of which are screwed hollow members 34ª and with which coact the end portions 37 of valve members 39 which are mounted for reciprocatory movement, in exactly the same manner as the valves 30, and which have stems 39ª. The valve members have valve portions 38 coacting with seats 36. Within the members 34 are displacement chambers 40. Quite naturally, any desired means may be provided for connecting the members 34 with the various bearings or the like to be lubricated. In every instance, the valves in displacement chambers 29 and 40 are each provided at one side with a longitudinal groove 41 which receives a leaf spring 42. Obviously, the groove 41 will permit a certain degree of communication between the two valve seats as will be explained.

In the operation, it will be apparent that when the vehicle travels over any inequalities in the roadway producing a bump, or shock the member 21 will engage against the plunger 18 and force it upwardly or inwardly. When the pressure is relieved, the spring 19 will act to return the plunger 18 to its lowered or normal position. The outward movement of the plunger tends to create a vacuum within the casing 10 and this tends to draw all of the valves 30 and 39 to their inner seats 28 and 35 respectively, thereby closing all the outlets on the main artery circuit and breaking down the resistance of the spring check 14 so that oil will flow into the casing 10. When the plunger 18 is subsequently moved upwardly or inwardly, the pressure of the oil will be in an outward direction and the oil will be forced through the pipe 22 into the casing 24.

All the valves 30 and 39 are then moved outwardly against their outer seats 27 and 36 respectively, the displacement chambers within which they are located being consequently filled with lubricant. Then when the pump plunger 18 is released and moved outwardly by the spring 19 the pressure drops through the entire circuit and a partial vacuum is created which draws inwardly on the valves. Upon the occurrence of suction due to the operation of spring 19 to return the pump plunger, the valves will be sucked back by the pressure difference on the whole area of the valves until the valve stems enter the conduit, at which time the pressure difference can no longer effect any part of the area of the valves except that of each end of the stems. The oil still in the valve chambers surrounding the stems is trapped, but by opening the leaf spring valve 42, it may escape, and while the suction continues to move the valves inwardly, this oil will be transferred to the outer ends of the valves. Upon the next pressure stroke, the valves are forced outwardly creating a vacuum around the stems in the valve chambers, which vacuum is instantly filled with lubricant as soon as the stems are out of the conduits. The valves will pause in their movements, while the chambers are filling up around the valves and then complete their outward movement forcing the lubricant ahead of them. This action is continuous and of course any time the abutment 21 engages the plunger 18 to an extent sufficient to actuate the same, lubricant is forced outward but of course the abutment does not actuate the plunger at every jar of the car due to the distance of the abutment from the plunger.

The frequency of operation of the plunger can be regulated by any well known means such as a cam or ratchet gear so fixed as to operate the pump only once after a number of jars of the vehicle.

It is obvious from the description of the operation that when the valves are drawn inwardly and the ends of the valve stems enter the ends of the conduits, the oil in the valve chambers surrounding the stems is trapped in measured quantities, and it is at this instant that the lubricant is measured out for its destination at the respective parts to be lubricated as suggested in Figure 1 of the drawings. It can be seen from the drawing that the measuring features of the valves depend upon the size of the stems in proportion to the spaces in the valve chambers in which they operate, as for instance, if two valves are of the same dimension with the exception that the stem of one of them is half as long as the stem of the other, the valve with the shorter stem will measure only half as much oil as the one with the long stem, with the result the shorter the stem the less oil the valve will measure. If the stem is entirely removed, the valve will reciprocate, but would not measure out any lubricant. This feature is referred to to illustrate the fact that the lubricant can be controlled from one extreme to another by lengthening or shortening the valve stems, so that due to this measuring feature of the valves, lubricant can be distributed in selective quantities to various bearing and wearing parts, as needed.

The pressure of the system can be regulated and it is apparent from the drawings, that the check valve 17 is so arranged as to allow the by-pass of lubricant from the casing 10 through the T-shaped member 16, through member 13 and back to the supply pipe 15. Obviously the spring tension on the valve 17 would have bearing on the pressure existing in the casing 10. Therefore, by increasing the spring tension on the valve, it would naturally increase the oil pressure, and by lessening the spring tension on the valve, it would decrease the oil pressure in the casing proportionately. Furthermore, through this means of adjustment, a pressure can be maintained in the pump chamber and associated pipes or tubes from a minimum to a maximum pressure.

It is apparent from the description of the operation that the valves at the terminus ends of the branch lines 25 will operate without the use of the feed valves 30. The feed valves 30 are intended to be used between the main artery 22 and the branch tubes 25 that are exposed to danger of breakage, so in the event of a broken tube these valves 30 will render the system operative with the loss only of a measured quantity of lubricant that would have been delivered to the parts through the broken tube. Without the use of the valve 30, should one of the branch tubes 25 become damaged or broken it would render the system entirely inoperative.

From the foregoing description and a study of the drawings, it will be apparent that I have thus provided a simply constructed, inexpensive and easily installed automatic lubricating system which needs no attention whatsoever after being once set in operation.

It is clear that the check valve 17 will act to regulate the pressure, and also to operate to free the pump from excess lubricant so that the pressure may drop at each impulse. It is really believed that the construction, operation and advantages will be readily apparent to one skilled in the art without further explanation.

While I have shown and described the preferred embodiment of the invention, it should be understood that I reserve the right to make such changes in the form, construction and arrangement of parts as will not depart from the spirit of the invention or the scope of the subjoined claims.

What is claimed is:—

1. In a lubricating system, the combination with relatively movable elements, of a pump mechanism carried by one element, means carried by the other element for operating said pump mechanism, a lubricant supply conduit leading into the pump mechanism, an outlet pipe extending from the pump mechanism, distributor means connected with said outlet pipe, a series of discharge pipes connected with the distributor means, a plurality of reciprocatory pressure and suction operated valves interposed between the distributor means and the discharge pipes and means to reciprocate said valves.

2. In a lubricating system of the character described, the combination with relatively movable machine elements, of a reciprocatory pump device carried by one element and including a plunger, a check valved inlet for the pump device, a conduit for the inlet, a check valved return connection between the pump and conduit, means on the other element engageable with the plunger for moving the same, a distributor connected with the pump device and receiving lubricant therefrom, metering valves included in the distributor, a plurality of branch discharge pipes connected at one of their ends with the distributor, a valve device connected with the opposite end of each discharge pipe, a leaf spring carried by each metering valve which is grooved for the accommodation of the spring and to permit by-pass of lubricant, stems for said metering valves for the purpose of trapping and measuring the lubricant, said metering valves being mounted for reciprocation and formed double ended with inner and outer seats.

3. In a lubricating system, a conduit in communication with a source of force feed lubricant supply having a valve chamber therein with opposed valve seats, a vibrating valve body in said chamber having opposed valve faces to alternately close against said seats, a one-way by-pass between said seats opening towards the outlet end of the conduit, and a projection on the valve body for snugly entering the conduit to trap lubricant in the chamber.

4. In a lubricating system, a conduit in communication with a source of force feed lubricant supply having a valve chamber therein with opposed valve seats, a vibrating valve body in said chamber having opposed valve faces adapted to close alternately against said seats, said valve body having a one-way by-pass therein opening only toward the outlet end of the conduit and a projection for snugly entering the conduit to trap lubricant in the chamber.

5. In a lubricating system, a conduit in communication with a source of force feed lubricant supply having a valve chamber with opposed valve seats, a valve body shorter than the chamber fitted snugly to vibrate therein and having opposed valve faces to close only alternately against said valve seats, said valve body having a projection on the end thereof toward the supply source for snugly moving into and out of the conduit to trap lubricant in the chamber, said valve body also having a by-pass therein opening only toward the outlet end of the conduit.

6. In a lubricating system, a conduit in communication with a source of force feed lubricant supply having a measuring chamber therein with a valve seat towards the outlet end of the conduit, a vibrating valve body in the chamber having a valve face to close against said valve seat in one position of the valve body and a projection to snugly enter the conduit on the supply side of the chamber in another position of the valve body, and a by-pass about the valve body opening only toward the outlet end of the conduit.

7. In a lubricating system, a conduit in communication with a source of force feed lubricant supply having a chamber therein with a valve seat toward the outlet end of the conduit, a valve body vibrating in the chamber, having a valve face to close against the valve seat in one position of the valve body and having means to snugly enter the conduit at the supply side and trap lubricant in the chamber when the valve body is shifted from said seat, and a one-way by-pass about the valve body opening toward the outlet end of the conduit for permitting of the transfer of the trapped lubricant about the valve body as the valve body is moving toward the supply side of the chamber.

8. In a lubricating system, a conduit in communication with a source of force feed supply having a metering chamber, a valve body fitted to vibrate in said chamber and adapted in one position to admit lubricant from the source under pressure to the chamber but to prevent its passing from the chamber to the outlet end of the conduit, said valve body having a part adapted to be drawn into the conduit at the supply side of the chamber for trapping the lubricant in the chamber, and a by-pass about the valve body opening only toward the outlet side of the chamber.

ERNEST J. SERPAS.